United States Patent [19]

Gauthier

[11] 3,874,061

[45] Apr. 1, 1975

[54] WIRE INSERTING DEVICE

[75] Inventor: Maurice Gauthier, Angouleme, France

[73] Assignee: COFPA-compagnie Des Feutres Pour Papeteries Et Des Tissus Industriels, Le Gond Pontouvre, France

[22] Filed: May 30, 1973

[21] Appl. No.: 365,326

[52] U.S. Cl. ................................................. 29/241
[51] Int. Cl. ............................................ B23p 19/04
[58] Field of Search ....... 29/241, 433; 254/134.3 FT

[56] References Cited
UNITED STATES PATENTS

| | | | |
|---|---|---|---|
| 1,681,829 | 8/1928 | Wesseler | 29/241 X |
| 1,880,431 | 10/1932 | Goodall | 254/134.3 FT |
| 2,559,160 | 7/1951 | Jacob | 254/134.3 FT |
| 3,353,255 | 11/1967 | Short | 29/241 X |

FOREIGN PATENTS OR APPLICATIONS 471,082  12/1945  Canada ................................ 29/241

1,111,259  7/1961  Germany .................... 254/134.3 FT

*Primary Examiner*—James L. Jones, Jr.
*Attorney, Agent, or Firm*—Sughrue, Rothwell, Mion, Zinn & Macpeak

[57] ABSTRACT

Device for inserting a thread-like element in a duct, sleeve or the like, having a certain length, more particularly in a sleeve formed by coils forming the connection of the ends of straps, cloths, belts or the like, comprising a gripping element enabling the device to be placed on the part in which the said thread-like element is to be inserted and the device to be held in the axis of the said duct, sleeve or the like, a device for guiding the thread-like element and an element for blocking and pushing the thread-like element enabling a thrust effort to be exerted on the said thread-like element.

3 Claims, 2 Drawing Figures

1

WIRE INSERTING DEVICE

BACKGROUND OF THE INVENTION

1 FIELD OF THE INVENTION

The invention concerns a device for inserting a threadlike element having a certain length in a duct, sleeve or the like.

DESCRIPTION OF THE PRIOR ART

A wire may withstand a thrust effort greater than its tensile strength, but the thrust effort it is able to withstand becomes slight as soon as bending occurs. That is why in general, use is made of wires by traction and not by thrust. But in certain cases, it is necessary to fit a wire or reed in a tube, in a sleeve formed with hoops or clips, for example in the case of the joining together of ends of cloths, fabrics, straps or belts, more particularly in preparing paper ware, especially for producing an endless fabric which may be used as a conveyor belt. These belts often have great dimensions and it is difficult to fit a connection reed by hand in the sleeve constituted by the assembling of the two series of clips, hoops or spirals fixed at each end of the belt. The resistance of the reed to insertion in the sleeve is due, on the one hand, to the friction of that reed on the clips and hoops to be locked, and, on the other hand, to the tension to which each end of the loop is subjected under the effect of its own weight. The effort required for the reed to be inserted in the sleeve therefore increases as this reed is inserted. When the cloth is wide, that is, when the connection is long, quickly, it becomes impossible to push the reed by hand in its sleeve.

The aim of the present invention is to produce a device enabling easy and certain movement of a reed throughout the whole connection, whatever the length of the latter may be.

SUMMARY OF THE INVENTION

The device which is the object of the invention is characterised in that it comprises: a gripping element enabling the device to be placed on the part in which the said thread-like element is required to be inserted and the device to be kept in the axis of the said duct, sleeve or the like a device for guiding the thread-like element, and an element for blocking and pushing the thread-like; element, enabling a thrust effort to be exerted on the said thread-like element.

The device according to the invention may, moreover, comprise preferably at least one of the following characteristics:

The guiding device comprises a tube having a diameter approximately the same as that of the thread-like element to be guided.

The guiding device comprises a set of washers each separated by a spring.

The element for blocking the thread-like element is constituted by link arms nipping the thread-like element.

The element for blocking the thread-like element is constituted by pressure rollers or wheels, clamping the thread-like element.

The device for guiding the thread-like element comprises a first, fixed, tube and a second tube sliding on the first tube.

The thrust element is driven by a power supply such as a pneumatic, hydraulic, magnetic or electric control means.

An end fitting with a rounded head is fitted to the end of the thread-like element to be inserted.

The following description gives two embodiments, by way of examples having no limiting character, of a device according to the invention in connection with the figures of the accompanying drawings.

DESCRIPTION OF PREFERRED EMBODIMENTS

Figure 1:
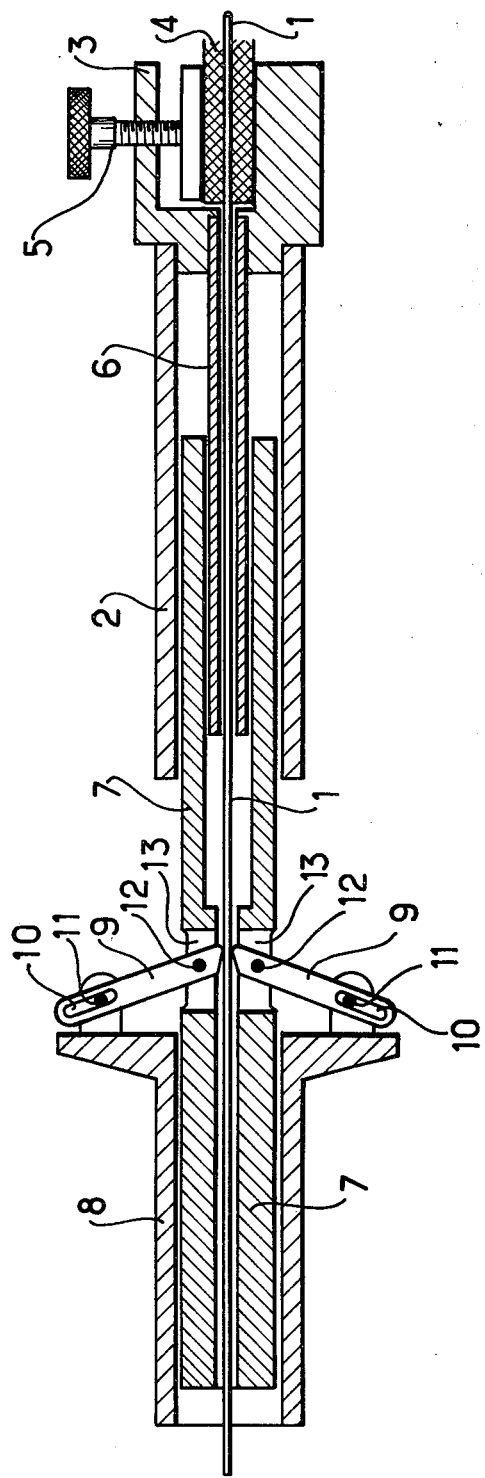
FIG. 1 is a diagrammatic sectional view of a wire-threading device having an alternating movement.

In the embodiment shown in FIG. 1, the device for threading the wire 1 comprises essentially three parts.

A first, fixed, part is constituted by a cylindrical body 2 at whose end there is a gripping element 3 in which is placed the edge of the cloth 4 to be connected. That cloth is clamped by screws 5. The wire 1 is inserted in a tube 6 which acts as a guide for it. This guide tube 6 is fixed on the inside of the body 2.

A second part which is mobile in relation to the fixed part 2, is constituted by a piston 7 consisting of a hollow tube sliding on the tube guide 6.

A third part which is mobile in relation to the second, mobile, part, constituted by a handle 8 sliding on the tube 7 and two link arms 9, articulated on the one hand, 1 by means of their slot 10, on an axis 11 borne by the handle 8 and on the other hand on an axis 12 borne by the tube 7. The latter comprises two slots 13 through which may pass, the link arms 9 which bear, at their ends, a knurled wire clamp plate.

OPERATION

Insertion of the reed in the device:

The handle-tube 8 is pulled backwards, this making the two link arms 9 pivot and clears a passage for the reed to pass in the tube 7.

The reed 1 is inserted through the tube 7 and the fixed tube 6 of the cylindrical body until it extends about 10 cm from the inserting device.

Inserting the reed in the connection:

The part of the reed extending from the inserting device is inserted at one end of the connection and the device is pointed along the axis of the connection. The device thus being centred properly, it is fixed in this position by clamping the gripping element 3 on the felt.

By pushing the handle 8 as far forward as possible, the two link arms 9, which block the reed which, whereas the forward movement of the parts 7 and 8 continues, moves and hence enters the connection, are pivoted.

By pulling the handle 8 backwards, the link arms are blocked, then the piston and handle assembly is removed without moving the reed backwards.

The cycle is started all over again until the reed passes through the connection.

The originality and advantages of the device according to the invention reside in the following points:

The reed is not subjected to bending, when it is moved, for it is guided by the tubes 6 and 7.

There is no danger of sliding the link arms on the reed when the reed is inserted, due to the geometrical configuration of the link arms, the position of the axes 11 and 12 and the mobility of the handle 8 in relation to the tube 7.

There is no danger of withdrawal of the reed, during the backward movement of the mobile assembly, for in a first phase, the handle 8, moving backward, unblocks the link arms which, without moving, free the reed, since the tube 7 is not affected.

On continuing the backward movement of the handle 8, the link arms are brought by rotation to the end of their travel in the tube 7, this then causing the backward movement of the mobile parts as a whole.

The centring and blocking of the device at the end of the connection is easily effected, enabling easy and certain implementing; the reaction of the thrust is absorbed by the gripping element 3.

Figure 2:
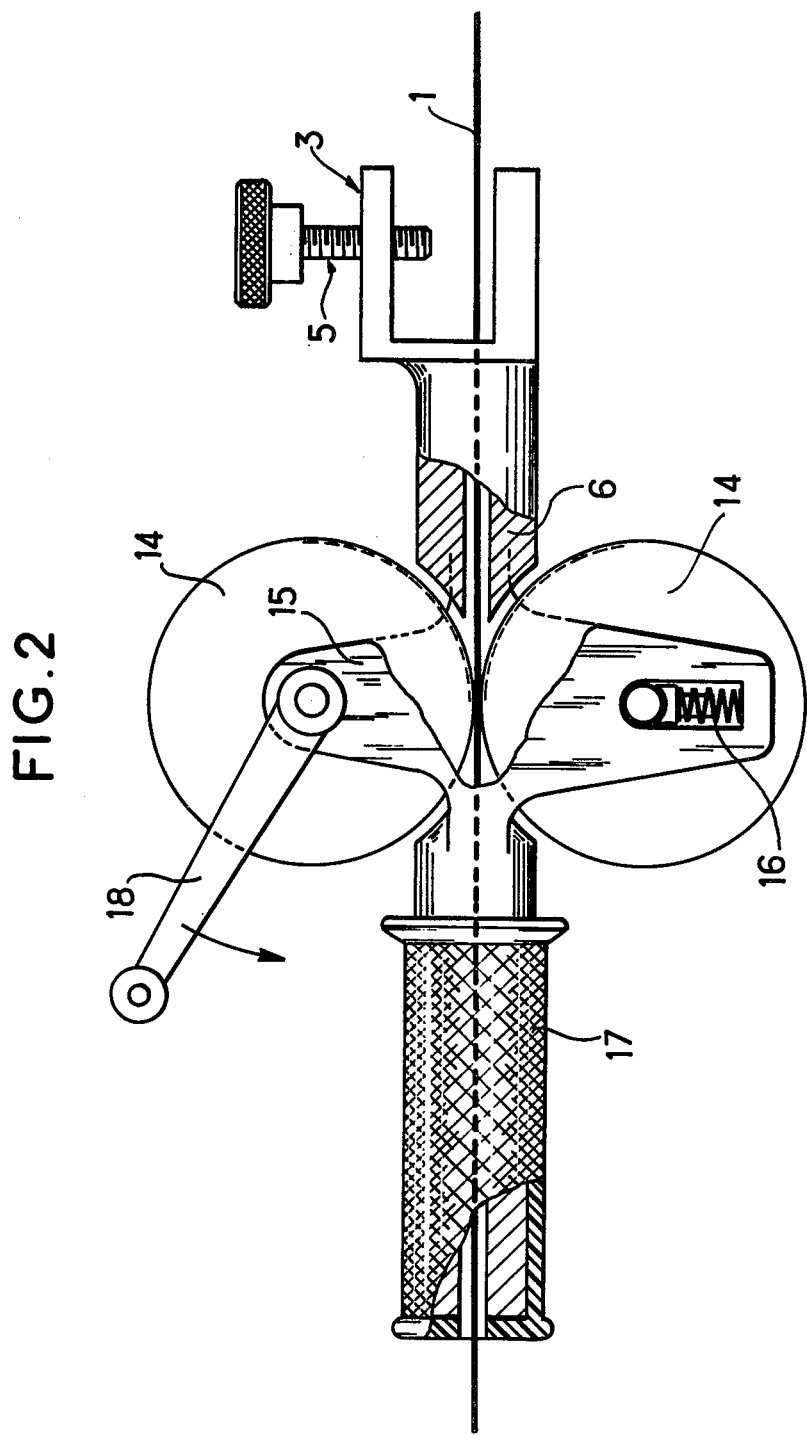
FIG. 2 is an enlarged elevational view, partially broken away, of a variant of the device, in which the wire is pushed in a continuous movement and like parts to that of FIG. 1 are given like numerical designations.

FIG. 2 shows a variant in which the reed 1 is subjected to a continuous thrust rather than an alternating thrust. The device comprises essentially the same elements as in FIG. 1 designated by the same references. The guide tube 6 is also fixed, but the link arms 9 and the piston tube 7 are replaced here by compression wheels 14 mounted on a frame 15 by means of springs 16 so as to adjust the position of the wheel as a function of the diameter of the wire and to provide pressure on the wire. The frame 15 is fixed on a handle 17 which is fixed, in this embodiment. The compression wheels press directly on the wire 1 and make it move forward by their rotation. For that purpose, the wheels 14 may be knurled. The drive of the wheels 14 may be effected manually by means of a handle 18 or preferably by any motor drive unit (hydraulic, pneumatic, electric...).

The operation and implementing of the device according to figure 2 is similar to that in figure 1, but it enables continuous movement of the reed in its sleeve to be obtained.

The embodiments of the invention described above are given only by way of indication, it being possible to replace each element by one or several equivalent elements nevertheless enabling the same function to be fulfilled.

For example:

In the gripping element, the screws may comprise alternatively cams, clips, springs, etc. The guide tube 6 may be replaced by a set of washers each separated by a spring. The alternating blocking system for the reed may be replaced by cams, or a click type compression wheel.

Male and female truncated cones may be substituted, in that case, the female truncated cone being situated at the end of the handle 8, the male truncated cone is constituted by the ends of two grip dogs which, by appropriate guiding, have a movement perpendicular to that of the axis of the ring.

Gripping elements controlled by an outside power supply (hydraulic, pneumatic, electric, magnetic, etc...) may also be employed.

The moving of the link arms or compression wheels for the wire may be effected by means of a pneumatic, hydraulic, magnetic, electric or other control arrangement, so as to provide automatic movement, at will, of the ring in the connection.

It is evident that with this device, it is possible to ensure, by thrust, the moving of any wire, of whatever type the latter may be and whatever the aim of the movement may be.

The device according to the invention enables the insertion of any thread-like element, for example a wire, a rod, a tube, drawn rigid or hollow, made of a metallic, plastic or metallo-plastic substance.

The thread-like element may consist of a piano string which itself constitutes the connection ring or of a piano string fixed to one end of the connection ring to enable the insertion thereof by exerting thrust on the piano string.

A rounded end fitting made, for example, of a plastic substance, may be fitted onto the end of the piano string so as to make the sliding of the string in the sleeve easier.

The inserting device according to the invention is, more particularly, an advantage for inserting a locking ring between the coils of a sliding type closing means.

I claim:

1. A device for inserting a thread-like element into a duct or the like, said device comprising:
   a clamping element for fixedly supporting the end of the duct within which said thread-like element is required to be inserted, said clamping element including a fixed thread guide tube positioned in axial alignment with said duct for receiving said thread-like element and feeding said thread-like element into said aligned duct, and
   multiple, symmetrical thread gripping and pushing means carried by said thread guide tube and engaging said thread-like element on opposite sides thereof, for exerting a thrust force on said thread-like element to move it axially first through said guide tube and secondly into said aligned duct.

2. The device as claimed in claim 1, wherein said clamping element further includes a fixed cylindrical body concentrically surrounding said guide tube, being spaced therefrom and extending to the same side of said clamping element as said guide tube, and wherein said device further comprises a hollow piston tube telescopingly slidable between said body and said guide tube and said thread clamping and pushing means comprising a tubular handle slidably mounted on said piston tube and a pair of link rods each being pivotably mounted at one end to said handle and adjacent the other end to said piston tube and having their radially inner ends passing through said piston tube for frictionally gripping opposite sides respectively of said thread like element during sliding movement of said handle relative to said piston tube in a direction toward said clamping element to force said thread-like element through said guide tube and into said duct and for releasing said thread-like element during sliding movement of said handle in a direction opposite thereto.

3. The device as claimed in claim 1, wherein said thread gripping and pushing means comprises a pair of compression wheels mounted for rotation on opposite sides of said guide tube with their peripheries contacting respective sides of said thread-like element, and means for biasing one of said compression wheels towards the other to frictionally grip said thread-like element therebetween, whereby rotation of said wheel drives said thread-like element axially within said guide tube to thrust force said thread-like element into said aligned duct.

* * * * *